US012785163B2

(12) United States Patent
Tang et al.

(10) Patent No.: US 12,785,163 B2
(45) Date of Patent: Nov. 3, 2026

(54) METHOD FOR RECYCLING IRON PHOSPHATE WASTE AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Chunxia Tang, Foshan (CN); Changdong Li, Foshan (CN); Shenghe Tang, Foshan (CN); Yanchao Qiao, Foshan (CN); Dingshan Ruan, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 540 days.

(21) Appl. No.: 18/373,966

(22) Filed: Sep. 28, 2023

(65) Prior Publication Data

US 2024/0021903 A1 Jan. 18, 2024

Related U.S. Application Data

(63) Continuation of application No. PCT/CN2021/142510, filed on Dec. 29, 2021.

(30) Foreign Application Priority Data

Apr. 6, 2021 (CN) ........................ 202110365978.8

(51) Int. Cl.

| | |
|---|---|
| ***H01M 10/54*** | (2006.01) |
| ***C01G 49/00*** | (2006.01) |
| ***C22B 1/00*** | (2006.01) |

(52) U.S. Cl.

CPC ............ *H01M 10/54* (2013.01); *C01G 49/00* (2013.01); *C22B 1/005* (2013.01)

(58) Field of Classification Search

CPC ..................................................... H01M 10/54

See application file for complete search history.

(56) References Cited

FOREIGN PATENT DOCUMENTS

| | | | |
|---|---|---|---|
| CN | 102208707 | A | 10/2011 |
| CN | 102285673 | A | 12/2011 |
| CN | 112499609 | A | 3/2021 |

OTHER PUBLICATIONS

Translation CN1106838528 (Year: 2020).*
International Search Report of PCT Patent Application No. PCT/CN2021/142510 issued on Mar. 18, 2022.

* cited by examiner

*Primary Examiner* — Jane J Rhee
(74) *Attorney, Agent, or Firm* — Westbridge IP LLC

(57) ABSTRACT

The present disclosure discloses a method for recycling iron phosphate waste and use thereof. The method includes: mixing the iron phosphate waste with an acid liquid for dissolution to obtain an iron-phosphorus solution; taking a small portion of the iron-phosphorus solution to prepare an iron phosphate precipitating agent; adding the iron phosphate precipitating agent to a remaining portion of the iron-phosphorus solution to react to obtain an iron phosphate dihydrate precipitate; and keeping a portion of the iron phosphate dihydrate precipitate as a precipitating agent for a reaction in a subsequent batch, and preparing a remaining portion of the iron phosphate dihydrate precipitate into anhydrous iron phosphate. In the present disclosure, an iron (Continued)

$FePO_4$ cyclic preparation flow chart, where the dotted line indicates the cyclic preparation process phosphate precipitating agent is prepared and used for the subsequent preparation of iron phosphate, and iron phosphate obtained in each preparation can be used for the next preparation of iron phosphate.

7 Claims, 4 Drawing Sheets

$FePO_4$ cyclic preparation flow chart, where the dotted line indicates the cyclic preparation process

METHOD FOR RECYCLING IRON PHOSPHATE WASTE AND USE THEREOF

CROSS-REFERENCE TO RELATED APPLICATIONS

The present application is a continuation application of PCT application No. PCT/CN2021/142510 filed on Dec. 29, 2021, which claims the benefit of Chinese Patent Application No. 202110365978.8 filed on Apr. 6, 2021. The contents of all of the aforementioned applications are incorporated by reference herein in their entirety.

TECHNICAL FIELD

The present disclosure belongs to the technical field of resource recycling, and specifically relates to a method for recycling iron phosphate waste and use thereof.

BACKGROUND

Compared with traditional batteries (energy storage materials), lithium-ion batteries (LIBs) have the advantages of high voltage, large specific capacity, long cycling life, and prominent safety performance. LIBs are widely used in portable electronic equipment, electric vehicle, aerospace, military engineering, and other fields, which have promising application prospects and huge economic benefits. Lithium iron phosphate (LFP) batteries are widely used in portable batteries, electric vehicles, and other fields due to their advantages such as environmental friendliness, low price, and long cycling life.

Since 2010, LFP batteries have been used in electric taxis and electric buses. More and more LFP batteries have been decommissioned, and it is difficult to recover the performance of LFP only by simple physical methods. Decommissioned LFP batteries are first subjected to lithium extraction, and the remaining part is often discharged as industrial waste, which causes a series of environmental pollution problems such as water eutrophication and also causes a serious waste of phosphorus and iron resources. In related art, a recycling method of LFP positive and negative electrode sheets is disclosed, where lithium is recovered from the electrode sheets, and then lithium is complemented to prepare LFP. However, the method has problems such as cumbersome technological procedures, high cost, high impurity content, and low compacted density. With the technical development, the performance of a regenerated LFP material can fully meet the commercial application standards. It is particularly important to develop a simple, low-cost, easily-controlled, and environmentally-friendly method for recycling iron phosphate, which is also of great significance for building a true closed-loop industrial chain.

SUMMARY

The present disclosure is intended to solve at least one of the technical problems existing in the prior art. In view of this, the present disclosure provides a method for recycling iron phosphate waste and use thereof. The method involves simple preparation process, high product consistency, low cost, high production capacity, and low energy consumption, and is environmentally friendly and suitable for large-scale industrial production.

According to one aspect of the present disclosure, a method for recycling iron phosphate waste is provided, including the following steps:

S1: mixing the iron phosphate waste with an acid liquid for dissolution, and filtering a resulting mixture to obtain an iron-phosphorus solution;

S2: adding an alkali liquid to a portion of the iron-phosphorus solution for pH adjustment, stirring and heating to allow a reaction, and filtering a resulting product to obtain an iron phosphate precipitating agent;

S3: washing the iron phosphate precipitating agent and adding the iron phosphate precipitating agent to a remaining portion of the iron-phosphorus solution; stirring and heating a resulting mixture to allow a reaction to obtain an iron phosphate dihydrate precipitate, and washing the iron phosphate dihydrate precipitate; and keeping a portion of the iron phosphate dihydrate precipitate as a precipitating agent for a reaction in a subsequent batch, and drying and sintering a remaining portion of the iron phosphate dihydrate precipitate to obtain anhydrous iron phosphate; and S4: repeating S1 to S3 where the iron phosphate precipitating agent added to the iron-phosphorus solution in S3 is the portion of the iron phosphate dihydrate precipitate kept in S3 from a previous batch.

In some implementations of the present disclosure, the iron phosphate waste may include one or more from the group consisting of an iron phosphate scrap, a waste obtained after subjecting LFP to lithium extraction, an iron-phosphorus residue obtained after subjecting an LFP electrode sheet to lithium extraction, and an iron-phosphorus residue obtained after subjecting an LFP battery to disassembly and lithium extraction.

In some implementations of the present disclosure, in S1, the acid liquid may include one or more from the group consisting of hydrochloric acid, sulfuric acid, nitric acid, and phosphoric acid.

In some implementations of the present disclosure, in S1, a molar ratio of acid anions in the acid liquid to iron ions in the iron phosphate waste may be (1.1-1.5):1.

In some implementations of the present disclosure, in S1, the mixing of the iron phosphate waste with the acid liquid for dissolution may include: adding the acid liquid with stirring, where the stirring may be conducted at a speed of 100 r/min to 400 r/min for 3 h to 5 h.

In some implementations of the present disclosure, in S2, the alkali liquid may include one or more from the group consisting of ammonia water, sodium hydroxide, potassium hydroxide, sodium carbonate, diammonium phosphate (DAP), sodium bicarbonate, and potassium bicarbonate; and the alkali liquid may be added at a speed of 0.1 L/min to 6 L/min.

In some implementations of the present disclosure, in S2, the pH may be adjusted to 0.5 to 2.5.

In some implementations of the present disclosure, in S2 and S3, the stirring may be conducted at a speed of 200 rpm/min to 600 rpm/min, the heating may be conducted at 80° C. to 100° C., and the reaction may be conducted for 2 h to 8 h.

In some implementations of the present disclosure, in S2, a filtrate obtained after the filtering may be added to the remaining portion of the iron-phosphorus solution in S3. Because there is still a small amount of $Fe^{3+}$ in the filtrate, direct discharge of the filtrate goes against the original intention of the present disclosure, and the addition of the filtrate to the remaining portion of the iron-phosphorus solution in S3 can achieve the purpose of recycling.

In some implementations of the present disclosure, in S3, a filtrate obtained after the filtering may be used for the dissolution of the iron phosphate waste in S1, which can reduce the consumption of acid liquid.

In some implementations of the present disclosure, in S3, a mass of the iron phosphate dihydrate precipitate kept may account for 5% to 40% of a total mass of the iron phosphate dihydrate precipitate produced.

In some implementations of the present disclosure, in S3, the drying may be conducted at 110° C. to 150° C. by a manner of flash evaporation or rake drying.

The present disclosure also provides use of the method for recycling iron phosphate waste described above in the preparation of an LFP battery.

According to a preferred implementation of the present disclosure, the present disclosure at least has the following beneficial effects:

1. In the present disclosure, an iron phosphate precipitating agent is added to make a produced iron phosphate precipitate have uniform particle size distribution, high crystallinity, and prominent compactness.

2. In the combined process where a small amount of a precipitate is added for cycling provided by the present disclosure, an iron phosphate precipitating agent is prepared and used for the subsequent preparation of iron phosphate, and iron phosphate obtained in each preparation can be used for the next preparation of iron phosphate. The preparation process is simple, and involves an alkali liquid only in the preparation of a precipitating agent and does not involve the use of an alkali liquid in the subsequent production, which is environmentally friendly. Moreover, the method of the present disclosure involves high product consistency, low cost, high production capacity, and low energy consumption, and is suitable for large-scale industrial production.

3. The anhydrous iron phosphate prepared by the present disclosure meets the standards of iron phosphate used for LFP and shows further-optimized performance, which has an initial specific charge capacity of 162 mAh/g at 1 C and an initial coulombic efficiency of more than 96%. The anhydrous iron phosphate can be directly used as a precursor for preparing LFP.

BRIEF DESCRIPTION OF DRAWINGS

The present disclosure is further described below with reference to accompanying drawings and examples.

DETAILED DESCRIPTION

Figure 1:
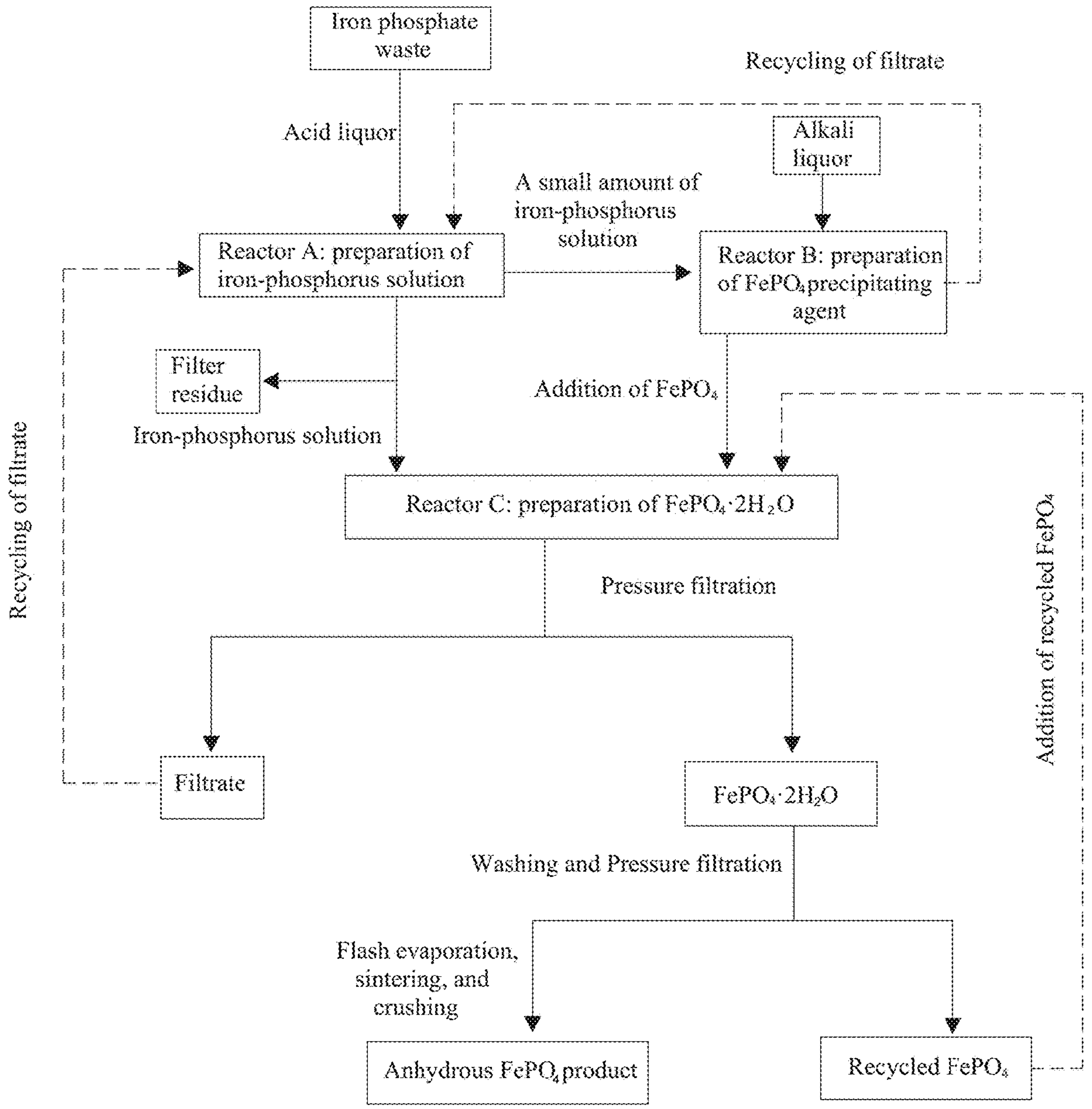
FIG. 1 is a process flow diagram of an example of the present disclosure.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

Iron phosphate was prepared in this example by a specific process including the following steps:

S1: 20 kg of a waste obtained after LFP was subjected to lithium extraction was added to a reactor A, 150 L of water was added, 10.5 L of concentrated sulfuric acid was added under stirring at a speed of 180 r/min, and the stirring was continued until the waste was completely dissolved to obtain an iron-phosphorus solution with iron ions, phosphate ions, and sulfate ions, where a molar ratio of acid anions to iron ions was 1.5:1;

S2: the iron-phosphorus solution in the reactor A obtained in S1 was passed through a filtration system to remove a small amount of impurities and then transferred to a reactor B and a reactor C through pipes, where 120 L of the iron-phosphorus solution entered the reactor C and 30 L of the iron-phosphorus solution entered the reactor B;

S3: ammonia water was added to the reactor B at a speed controlled at 3 L/h, and when a pH of the solution was 3.0, the addition of ammonia water was stopped, and stirring was started at a speed controlled at 300 rpm/min; the reactor B was heated to 94° C. and kept at the temperature for 3 h; and a resulting precipitate was filtered out, washed, and dried by flash evaporation at 120° C. to obtain an iron phosphate precipitating agent, which would be used in S4; where a resulting filtrate of the reactor B was transferred into the reactor C;

S4: the iron phosphate precipitating agent obtained in S3 was added to the reactor C, and the reactor C was heated to 88° C. and kept at the temperature for 6 h to obtain an iron phosphate dihydrate precipitate; the iron phosphate dihydrate precipitate was filtered out, washed until a conductivity was lower than 500 μS/cm, and subjected to pressure filtration to obtain an iron phosphate dihydrate filter cake; and 6 kg of the iron phosphate dihydrate filter cake was kept as a precipitating agent for a reaction in a subsequent batch, and a remaining portion of the iron phosphate dihydrate filter cake was dried by flash evaporation and incubated at 500° C. for 10 h in a rotary kiln to obtain anhydrous iron phosphate; where a resulting filtrate of the reactor C was returned to the reactor A to participate in the dissolution of iron phosphate waste; and S5: S1 was repeated, and a resulting iron-phosphorus solution in the reactor A was filtered and added to the reactor C; then the iron phosphate dihydrate kept in S4 was added to the reactor C to achieve the preparation of iron phosphate in the next batch; after iron phosphate dihydrate was obtained, 1 kg to 8 kg of the iron phosphate dihydrate was kept; and anhydrous iron phosphate could be cyclically prepared in the reactor C according to the above steps.

Example 2

Iron phosphate was prepared in this example by a specific process including the following steps:

S1: 40 kg of an iron phosphate scrap was added to a reactor A, 300 L of water was added, 13.5 L of concentrated nitric acid was added under stirring at a speed of 180 r/min, and the stirring was continued until the waste was completely dissolved to obtain an iron-phosphorus solution with iron ions, phosphate ions, and nitrate ions, where a molar ratio of acid anions to iron ions was 1.15:1;

S2: the iron-phosphorus solution in the reactor A obtained in S1 was passed through a filtration system to remove a small amount of impurities and then transferred to a reactor B and a reactor C through pipes, where 240 L of the iron-phosphorus solution entered the reactor C and 60 L of the iron-phosphorus solution entered the reactor B;

S3: sodium hydroxide was added to the reactor B at a speed controlled at 3.5 L/h, and when a pH of the solution was 3.2, the addition of sodium hydroxide was stopped, and stirring was started at a speed controlled at 400 rpm/min; the reactor B was heated to 92° C. and kept at the temperature for 4 h; and a resulting precipitate was filtered out, washed, and dried by flash evaporation at 120° C. to obtain an iron phosphate precipitating agent, which would be used in S4; where a resulting filtrate of the reactor B was transferred into the reactor C;

S4: the iron phosphate precipitating agent obtained in S3 was added to the reactor C, and the reactor C was heated to 94° C. and kept at the temperature for 3 h to obtain an iron phosphate dihydrate precipitate; the iron phosphate dihydrate precipitate was filtered out, washed until a conductivity was lower than 500 μS/cm, and subjected to pressure filtration to obtain an iron phosphate dihydrate filter cake; and 10 kg of the iron phosphate dihydrate filter cake was kept as a precipitating agent for a reaction in a subsequent batch, and a remaining portion of the iron phosphate dihydrate filter cake was rake-dried at 120° C. and incubated at 650° C. for 5 h in a rotary kiln to obtain anhydrous iron phosphate; where a resulting filtrate of the reactor C was returned to the reactor A to participate in the dissolution of iron phosphate waste; and S5: S1 was repeated, and a resulting iron-phosphorus solution in the reactor A was filtered and added to the reactor C; then the iron phosphate dihydrate kept in S4 was added to the reactor C to achieve the preparation of iron phosphate in the next batch; after iron phosphate dihydrate was obtained, 2 kg to 16 kg of the iron phosphate dihydrate was kept; and anhydrous iron phosphate could be cyclically prepared in the reactor C according to the above steps.

Example 3

Iron phosphate was prepared in this example by a specific process including the following steps:

S1: 50 kg of an iron-phosphorus residue obtained after an LFP battery was subjected to disassembly and lithium extraction was added to a reactor A, 370 L of water was added, 10 L of 85% phosphoric acid and 10 L of concentrated hydrochloric acid were added under stirring at a speed of 180 r/min, and the stirring was continued until the waste was completely dissolved to obtain an iron-phosphorus solution with iron ions, phosphate ions, and chloride ions, where a molar ratio of acid anions to iron ions was 1.2:1;

S2: the iron-phosphorus solution in the reactor A obtained in S1 was passed through a filtration system to remove a small amount of impurities and then transferred to a reactor B and a reactor C through pipes, where 300 L of the iron-phosphorus solution entered the reactor C and 70 L of the iron-phosphorus solution entered the reactor B;

S3: 3 mol/L DAP was added to the reactor B at a speed controlled at 2 L/h, and when a pH of the solution was 2.9, the addition of DAP was stopped, and stirring was started at a speed controlled at 300 rpm/min; the reactor B was heated to 92° C. and kept at the temperature for 5 h; and a resulting precipitate was filtered out, washed, and dried by flash evaporation at 120° C. to obtain an iron phosphate precipitating agent, which would be used in S4; where a resulting filtrate of the reactor B was transferred into the reactor C;

S4: the iron phosphate precipitating agent obtained in S3 was added to the reactor C, and the reactor C was heated to 90° C. and kept at the temperature for 5 h to obtain an iron phosphate dihydrate precipitate; the iron phosphate dihydrate precipitate was filtered out, washed until a conductivity was lower than 500 μS/cm, and subjected to pressure filtration to obtain an iron phosphate dihydrate filter cake; and 4 kg of the iron phosphate dihydrate filter cake was kept as a precipitating agent for a reaction in a subsequent batch, and a remaining portion of the iron phosphate dihydrate filter cake was dried by flash evaporation at 120° C. and incubated at 550° C. for 10 h in a rotary kiln to obtain anhydrous iron phosphate; where a resulting filtrate of the reactor C was returned to the reactor A to participate in the dissolution of iron phosphate waste; and S5: S1 was repeated, and a resulting iron-phosphorus solution in the reactor A was filtered and added to the reactor C; then the iron phosphate dihydrate kept in S4 was added to the reactor C to achieve the preparation of iron phosphate in the next batch; after iron phosphate dihydrate was obtained, 2 kg to 20 kg of the iron phosphate dihydrate was kept; and anhydrous iron phosphate could be cyclically prepared in the reactor C according to the above steps.

Example 4

Iron phosphate was prepared in this example by a specific process including the following steps:

S1: 30 kg of an iron-phosphorus residue obtained after an LFP electrode sheet was subjected to lithium extraction was added to a reactor A, 200 L of water was added, 6.5 L of phosphoric acid and 6 L of nitric acid were added under stirring at a speed of 150 r/min, and the stirring was continued until the waste was completely dissolved to obtain an iron-phosphorus solution with iron ions, phosphate ions, and nitrate ions, where a molar ratio of acid anions to iron ions was 1.3:1;

S2: the iron-phosphorus solution in the reactor A obtained in S1 was passed through a filtration system to remove a small amount of insoluble residue in the electrode sheet and then transferred to a reactor B and a reactor C through pipes, where 160 L of the iron-phosphorus solution entered the reactor C and 40 L of the iron-phosphorus solution entered the reactor B;

S3: 5 mol/L sodium carbonate was added to the reactor B at a speed controlled at 6 L/h, and when a pH of the solution was 2.5, the addition of sodium carbonate was stopped, and stirring was started at a speed controlled at 400 rpm/min; the reactor B was heated to 92° C. and kept at the temperature for 3 h; and a resulting precipitate was filtered out, washed, and rake-dried at 120° C. to obtain an iron phosphate precipitating agent, which would be used in S4; where a resulting filtrate of the reactor B was transferred into the reactor C;

S4: the iron phosphate precipitating agent obtained in S3 was added to the reactor C, and the reactor C was heated to 96° C. and kept at the temperature for 3 h to obtain an iron phosphate dihydrate precipitate; the iron phosphate dihydrate precipitate was filtered out, washed until a conductivity was lower than 500 μS/cm, and subjected to pressure filtration to obtain an iron phosphate dihydrate filter cake; and 3 kg of the iron phosphate dihydrate filter cake was kept as a precipitating agent for a reaction in a subsequent batch, and a remaining portion of the iron phosphate dihydrate filter cake was rake-dried at 120° C. and incubated at 600° C. for 5 h in a rotary kiln to obtain anhydrous iron phosphate; where a resulting filtrate of the reactor C was returned to the reactor A to participate in the dissolution of iron phosphate waste; and S5: S1 was repeated, and a resulting iron-phosphorus solution in the reactor A was filtered and added to the reactor C; then the iron phosphate dihydrate kept in S4 was added to the reactor C to achieve the preparation of iron phosphate in the next batch; after iron phosphate dihydrate was obtained, 1.5 kg to 12 kg of the iron phosphate dihydrate was kept; and anhydrous iron phosphate could be cyclically prepared in the reactor C according to the above steps.

Comparative Example 1

Iron phosphate was prepared in this Comparative Example by a specific process including the following steps:

S1: 50 kg of an iron-phosphorus residue obtained after an LFP battery was subjected to disassembly and lithium extraction was added to a reactor A, 370 L of water was added, 27.0 L of 85% phosphoric acid was added under stirring at a speed of 180 r/min, and the stirring was continued until the waste was completely dissolved to obtain an iron-phosphorus solution with iron ions, phosphate ions, and chloride ions, where a molar ratio of acid anions to iron ions was 1.2:1;

S2: the iron-phosphorus solution in the reactor A obtained in S1 was passed through a filtration system to remove a small amount of impurities and then transferred to a reactor B through a pipe; 75 L to 80 L of 6 mol/L DAP was added to the reactor B at a speed of 2 L/min, and when a pH of the solution was 2.9 to 3.0, stirring was started at a speed controlled at 300 rpm/min; the reactor B was heated to 92° C. and kept at the temperature for 5 h; and a resulting precipitate was filtered out, washed, and dried by flash evaporation at 120° C. to obtain iron phosphate; and S3: the iron phosphate obtained in S2 was incubated at 550° C. for 10 h in a rotary kiln to obtain anhydrous iron phosphate.

EXPERIMENTAL EXAMPLE

The anhydrous iron phosphate initially prepared and the anhydrous iron phosphate obtained after 3 cycles in Examples 1 to 4 were tested for physical and chemical indexes, and the physical and chemical indexes of the anhydrous iron phosphate initially prepared were compared with that of the anhydrous iron phosphate obtained after 3 cycles. Results were shown in Table 1 below.

TABLE 1

Test results of physical and chemical indexes of the anhydrous iron phosphate prepared in Examples 1 to 4

| Item | Standards of iron phosphate for LFP cathode materials | Example 1 | Example 2 | Example 3 | Example 4 |
|---|---|---|---|---|---|
| Anhydrous iron phosphate initially prepared | | | | | |
| Fe/% | 36.00 to 37.00 | 36.05 | 36.26 | 36.35 | 36.31 |
| P/% | 20.50 to 21.00 | 20.53 | 20.63 | 20.74 | 20.57 |
| Fe/P | 0.960 to 1.0 | 0.974 | 0.974 | 0.972 | 0.979 |
| Compacted density ($g/cm^3$) | ≥0.60 | 0.65 | 0.80 | 0.78 | 0.81 |
| Anhydrous iron phosphate obtained after 3 cycles | | | | | |
| Fe/% | 36.00 to 37.00 | 36.07 | 36.03 | 36.31 | 36.21 |
| P/% | 20.50 to 21.00 | 20.62 | 20.56 | 20.57 | 20.70 |
| Fe/P | 0.960 to 1.0 | 0.970 | 0.972 | 0.976 | 0.978 |
| Compacted density ($g/cm^3$) | ≥0.60 | 0.67 | 0.79 | 0.82 | 0.81 |

It can be seen from Table 1 that, for both the anhydrous iron phosphate initially prepared and the anhydrous iron phosphate obtained after 3 cycles in the method of the present disclosure, various physical and chemical indexes are in line with the standards for LFP cathode materials, indicating that the anhydrous iron phosphate prepared by the cycle process has stable quality and the process is reliable.

The anhydrous iron phosphate initially prepared and the anhydrous iron phosphate obtained after 3 cycles in Example 3 and the commercially-available anhydrous iron phosphate (purchased from Langfang Nabo Chemical Technology Co., Ltd.) were used to prepare LFP according to the following method: 2,800 ml of water, 1,000 g of iron phosphate, 80 g of glucose, and 80 g of PEG dispersed in 200 g of hot water were mixed, where a final solid-to-liquid ratio was controlled at 35%; the mixture was dispersed with a high-speed disperser for 30 min and then poured into a sand mill for fine grinding, where a slurry D50 was controlled at 500 nm to 550 nm during the fine grinding; a resulting material was spray-dried at an air outlet temperature controlled at 100° C. to 110° C.; and the material was sintered at 750° C. for 10 h in a sagger introduced with nitrogen as an inert protective gas to obtain highly-compacted LFP. The prepared LFP was tested for performance indexes of all aspects, and results were shown in Table 2 below:

TABLE 2

Comparison of performance indexes of LFP

| Item | LFP prepared from anhydrous iron phosphate initially obtained Example 3 | LFP prepared from anhydrous iron phosphate obtained after 3 cycles Example 3 | LFP prepared from commercially-available iron phosphate (Langfang Nabo) |
|---|---|---|---|
| C/% | 1.42 | 1.45 | 1.45 |
| BET ($m^2/g$) | 16 | 13.2 | 12 |
| Powder compacted density (g/cc) | 2.36 | 2.46 | 2.20 |
| Initial specific charge capacity at 1 C (mAh/g) | 162 | 161.3 | 161 |
| Initial specific discharge capacity at 1 C (mAh/g) | 156 | 157.2 | 154 |
| Initial coulombic efficiency (%) | 96.3 | 97.4 | 95.6 |
| Specific charge capacity after 200 cycles at 1 C (mAh/g) | 136 | 137 | 134 |

It can be seen from Table 2 that the compacted density and specific surface area (SSA) of the LFP powder synthesized from anhydrous iron phosphate in the examples of the present disclosure are higher than that of the LFP synthesized from the commercially-available iron phosphate, and the electrochemical performance of the LFP powder synthesized from anhydrous iron phosphate in the examples of the present disclosure is also slightly better than that of the LFP synthesized from the commercially-available iron phosphate, indicating that the anhydrous iron phosphate prepared by the present disclosure has reached the standards of iron phosphate used for LFP and shows further-optimized performance, and thus can be directly used as a precursor for the production of LFP. In addition, the anhydrous iron phosphate initially prepared has comparable properties to the anhydrous iron phosphate obtained after 3 cycles, indicating that the anhydrous iron phosphate prepared by the cycle process has stable quality and the process is very stable.

FIG. 1 is a process flow diagram of an example of the present disclosure. It can be seen from the figure that iron phosphate waste is mixed with and dissolved in an acid liquid in a reactor A to obtain an iron-phosphorus solution; a portion of the iron-phosphorus solution is added to a reactor B and subjected to precipitation to prepare an iron phosphate precipitating agent; a resulting mixture is filtered, a resulting filtrate is returned to the reactor A, and a filter residue is washed and added as the precipitating agent to a reactor C; a remaining portion of the iron-phosphorus solution is completely added to the reactor C, where an iron phosphate dihydrate precipitate is formed in the iron-phosphorus solution in the reactor C under the action of the iron phosphate precipitating agent; a resulting mixture is filtered, a resulting filtrate is returned to the reactor A, and a small amount of a resulting filter residue is returned as the precipitating agent to the reactor C; and a remaining portion of the filter residue is washed, dried, and sintered to obtain an anhydrous iron phosphate product.

Figure 2:
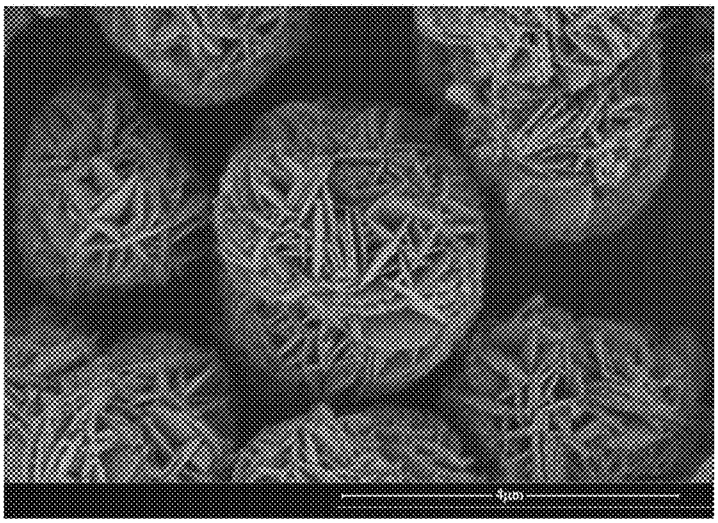
FIG. 2 is a scanning electron microscopy (SEM) image of iron phosphate initially prepared in Example 3 of the present disclosure.
Figure 3:
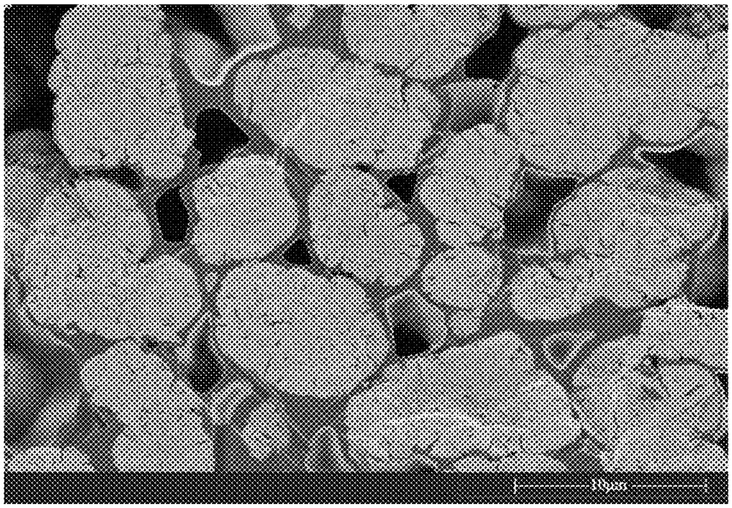
FIG. 3 is an SEM image of a cross section of the iron phosphate prepared in Example 3 of the present disclosure.

FIG. 2 shows an SEM image of the iron phosphate initially prepared in Example 3 of the present disclosure and FIG. 3 shows an SEM image of a cross section of the iron phosphate initially prepared in Example 3 of the present disclosure. It can be seen from the figure that the iron phosphate has excellent crystallinity, spherical morphology where it is uniform in all directions, compacted agglomerates, thin sub-structure lamellae, micropores inside, and uniform particle size distribution.

Figure 4:
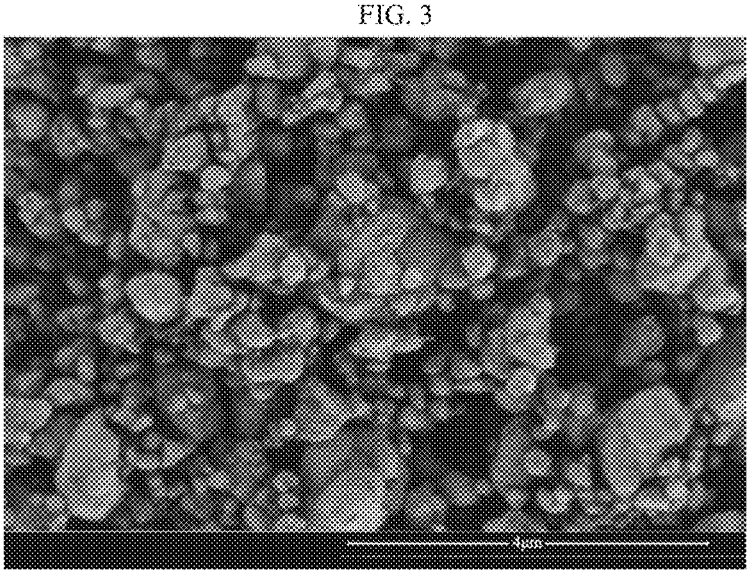
FIG. 4 is an SEM image of LFP prepared from the iron phosphate obtained in Example 3.

FIG. 4 is an SEM image of LFP prepared from the iron phosphate obtained in Example 3. It can be seen from the figure that the LFP has round particles with regular morphology.

Figure 5:
FIG. 5 is an SEM image of Langfang Nabo iron phosphate.

FIG. 5 is an SEM image of Langfang Nabo iron phosphate. It can be seen from the figure that the iron phosphate is formed by the stacking of flaky sub-structures, which has a particle morphology not as regular as that of Example 3 and a particle size distribution not as uniform as that of Example 3.

Figure 6:
FIG. 6 is an SEM image of LFP prepared from the Langfang Nabo iron phosphate.

FIG. 6 is an SEM image of LFP prepared from the Langfang Nabo iron phosphate. It can be seen from the SEM image that particles are very irregular, and particles with this morphology will lead to a low compacted density for LFP. In addition, the irregular particles will also cause uneven carbon coating. The body of an unevenly-coated material is susceptible to corrosion of an electrolyte, so the electrical performance is easily deteriorated due to the leaching of elements in the rate and long cycle.

Figure 7:
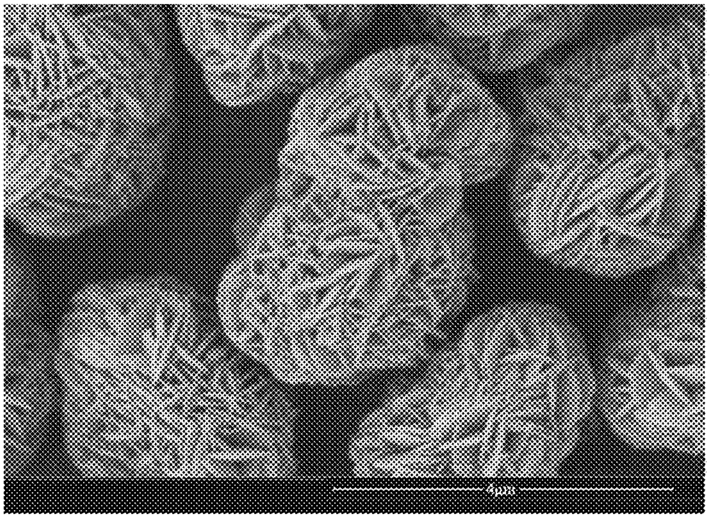
FIG. 7 is an SEM image of iron phosphate obtained after 3 cycles in Example 3 of the present disclosure.

FIG. 7 is an SEM image of iron phosphate obtained after 3 cycles in Example 3 of the present disclosure. It can be seen from the SEM image that the iron phosphate obtained after 3 cycles shows inheritance in morphology relative to the iron phosphate initially prepared, indicating prominent stability of the process.

Figure 8:
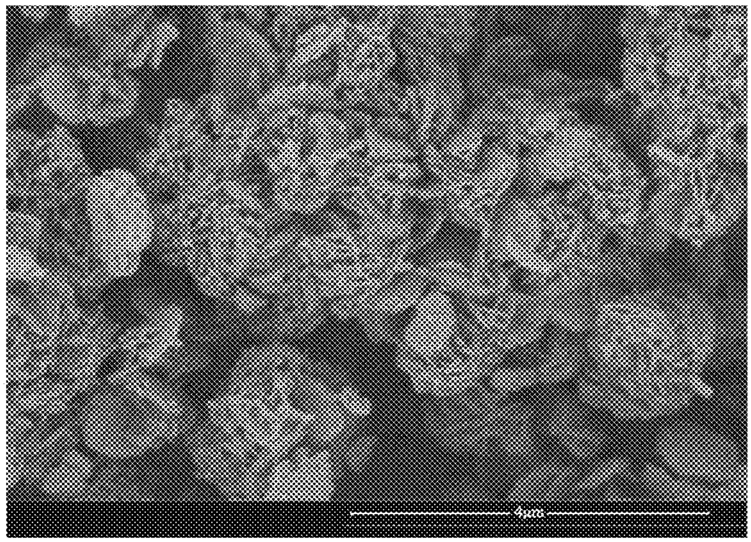
FIG. 8 is an SEM image of iron phosphate prepared in Comparative Example 1 of the present disclosure.

FIG. 8 is an SEM image of iron phosphate prepared according to the conventional process in Comparative Example 1. It can be seen from the SEM image that the iron phosphate prepared by the conventional process is flaky and has relatively-loose secondary agglomerates.

The present disclosure also compares Example 3 with Comparative Example 1 in terms of alkali consumption, specifically as shown in Table 3.

TABLE 3

| Cumulative amount of treated iron-phosphorus residue (kg)/Alkali consumption (L)/Treatment method | Example 3 | Comparative Example 1 |
|---|---|---|
| 50 | 20 to 25 | 75 to 80 |
| 100 | 20 to 25 | 150 to 160 |
| 150 | 20 to 25 | 225 to 240 |

It can be seen from Table 3 that, in Example 3, alkali liquid is used only in the initial preparation, and an alkali liquid consumption in the initial preparation only accounts for about ¼ of an alkali liquid consumption in Comparative Example 1; and in Example 3, after the iron phosphate precipitate is recycled, the subsequent process does not involve the use of alkali liquid, but in Comparative Example 1, the alkali liquid consumption will increase with the increase in the treatment capacity of iron-phosphorus residue, indicating that the method of the present disclosure is more environmentally friendly and more economical than the conventional method.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure and features in the examples may be combined with each other in a non-conflicting situation.

The invention claimed is:

1. A method for recycling iron phosphate waste, comprising the following steps:

S1: mixing the iron phosphate waste with an acid liquid for dissolution, and filtering a resulting mixture to obtain an iron-phosphorus solution;

S2: adding an alkali liquid to a portion of the iron-phosphorus solution for pH adjustment, stirring and heating to allow a reaction, and filtering a resulting product to obtain an iron phosphate precipitating agent;

S3: washing the iron phosphate precipitating agent and adding the iron phosphate precipitating agent to a remaining portion of the iron-phosphorus solution; stirring and heating a resulting mixture to allow a reaction to obtain an iron phosphate dihydrate precipitate, and filtering out and washing the iron phosphate dihydrate precipitate; and keeping a portion of the iron phosphate dihydrate precipitate as a precipitating agent for a reaction in a subsequent batch, and drying and sintering a remaining portion of the iron phosphate dihydrate precipitate to obtain anhydrous iron phosphate, wherein a mass of the portion of the iron phosphate dihydrate precipitate kept accounts for 5% to 40% of a total mass of the iron phosphate dihydrate precipitate produced; and S4: repeating S1 to S3 wherein the iron phosphate precipitating agent added to the iron-phosphorus solution in S3 is the portion of the iron phosphate dihydrate precipitate kept in S3 from a previous batch, in S3, a filtrate obtained after the filtering is used for the dissolution of the iron phosphate waste in S1; in S2, a filtrate obtained after the filtering is added to the remaining portion of the iron-phosphorus solution in S3.

2. The method for recycling iron phosphate waste according to claim 1, wherein the iron phosphate waste comprises one or more from the group consisting of an iron phosphate scrap, a waste obtained after subjecting lithium iron phosphate (LFP) to lithium extraction, an iron-phosphorus residue obtained after subjecting an LFP electrode sheet to lithium extraction, and an iron-phosphorus residue obtained after subjecting an LFP battery to disassembly and lithium extraction.

3. The method for recycling iron phosphate waste according to claim 1, wherein in S1, the acid liquid comprises one or more from the group consisting of hydrochloric acid, sulfuric acid, nitric acid, and phosphoric acid; and a molar ratio of acid anions in the acid liquid to iron ions is (1.1-1.5):1.

4. The method for recycling iron phosphate waste according to claim 1, wherein in S1, the mixing of the iron phosphate waste with the acid liquid for dissolution comprises: adding the acid liquid with stirring, wherein the stirring is conducted at a speed of 100 r/min to 400 r/min for 3 h to 5 h.

5. The method for recycling iron phosphate waste according to claim 1, wherein in S2, the alkali liquid comprises one or more from the group consisting of ammonia water, sodium hydroxide, potassium hydroxide, sodium carbonate, diammonium phosphate (DAP), sodium bicarbonate, and potassium bicarbonate.

6. The method for recycling iron phosphate waste according to claim 1, wherein in S2, the pH is adjusted to 0.5 to 2.5.

7. The method for recycling iron phosphate waste according to claim 1, wherein in S2 and S3, the stirring is conducted at a speed of 200 rpm/min to 600 rpm/min, the heating is conducted at 80° C. to 100° C., and the reaction is conducted for 2 h to 8 h.

* * * * *